Patented Oct. 12, 1954

2,691,616

UNITED STATES PATENT OFFICE 2,691,616

NITROTHIOPHENE INSECTICIDAL COMPOSITION AND PROCESS OF USING SAME

Joseph B. Dickey and Harry W. Coover, Jr., Rochester, N. Y., assignors to Eastman Kodak Company, Rochester, N. Y., a corporation of New Jersey No Drawing. Application November 7, 1949, Serial No. 126,052

6 Claims. (Cl. 167—33)

This invention relates to compositions useful for insecticidal purposes. More specifically, the invention is concerned with insecticidal compositions containing nitrothiophenes, together with a carrier therefor.

Compounds to be of value for insecticidal purposes should ordinarily be light-stable, compatible with light paraffinic mineral oils, free from harmful effects to plants, free of a tendency to stain wools, fabrics, etc., and be not offensive to human beings.

Many of the insecticides which are known at the present time are objectionable on one or more of the above counts. Some of these insecticides are short-lived in effectiveness. Others are harmful to plants at the concentrations and under the conditions used or else have some other undesirable characteristic which interferes with the usefulness of those insecticides in practical application.

One object of our invention is to provide insecticidal compositions which are highly toxic to insects but are of low toxicity to man and other warm-blooded animals. Another object of our invention is to provide insecticidal compositions which are simple to use but are highly effective against various insects of a destructive nature, such as to plant life, food materials or the like. A further object of our invention is to provide compositions which are effective both as regards insects and as regards parasitic organisms which are ordinarily classified as fungi. A still further object of our invention is to provide nitrothiophenes in a form which is highly useful for combating harmful insect life. Other objects of our invention will appear herein.

We have found that the nitrothiophenes are highly effective in insecticidal compositions for use in combating the most commonly known forms of destructive insect life. The compounds which we have found to be of value for this purpose are those having the following general formula:

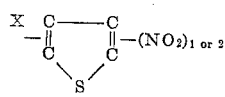

wherein X is selected from hydrogen, halogen, alkyl, aryl, carboxy, sulfonyl, CH=O and ketones. For example, a nitro group may occupy one or two of the available positions on the ring and the other positions on the ring may be taken by other substituents such as hydrogen, a halogen such as bromine, chlorine or fluorine, alkyl, aryl, carboxy and its derivatives, sulfonyl and its derivatives, CH=O and its derivatives (oximes, hydrazones and semi-carbazides), ketones and its derivatives. Compounds of the type which are useful in my invention are described in a survey of the literature on these nitro compounds. See Steinkopf, "Die Chemie des Thiophenes"; J. W. Edwards, Ann Arbor, Michigan; and Avery A. Morton "The Chemistry of Heterocyclic Compounds," chapter 3, McGraw-Hill, New York. Also, some of these compounds are found in other literature references.

Compounds which are useful in our invention and which are described on pages 58 and 84 of Steinkopf are:

2- and 3-nitrothiophene
2,4-dinitrothiophene
2,5-dinitrothiophene
4-nitrothiophene-2-carboxylic acid
2,5-dibromo-3-nitrothiophene
3,5 - dinitro - 4 - methylthiophene - 2 - carboxylic ester
5 - nitro - 4 - methylthiophene - 2 - carboxylic ester
4,5-dichloro-2-nitrothiophene
3,4,5-trichloro-2-nitrothiophene
2,5-dichloro-3,4-dinitrothiophene and
2,4-dibromo-3,5-dinitrothiophene Other compounds of interest and the literature references where their preparation is referred to is as follows:

2,3 - dichloro - 5 - nitrothiophene and 2 - bromo-5-nitrothiophene—Ann. 532, 250 (1937)
3,4 - dibromo - 2,5 - dinitrothiophene—Ann. 512, 136 (1934)
2-bromo-5-nitrothiophene
3 - nitro - 2,4,5 - trichlorothiophene—Ann. 532, 250 (1937)

The disclosure in the Annalen in vol. 512, page 136, and vol. 532, page 250, is to be considered as part of the present disclosure of halogenated nitrothiophenes useful in the compositions of this invention.

The insecticidal value of the nitrothiophenes is shown by various tests carried out by contacting insects with this compound. For instance, by preparing a dust of a nitrothiophene and an inert carrier, such as pyrophyllite, and after placing fruit flies in a bottle, sprinkling with the dust and observing the flies at intervals, it may be seen that 100% kill of those fruit flies is obtained in a short time. For instance, with 2,4-dinitrothiophene in such a test using a proportion of one part of the nitrothiophene to 100 parts of carrier a 100% kill was obtained within one-half hour. With 2,5-dichloro-3,4-dinitrothiophene in the same type of test a complete kill was obtained within two hours. In tests with the nitrothiophenes in various concentrations it was found that the effectiveness of dusts ranging in concentration from one part of nitrothiophene to 20 parts of carrier to one part of a nitrothiophene to 1000 parts of carrier substantially the same degree of kill was obtained while with dusts in which greater dilutions were used, the effectivenes was not as great. For instance, using one part of a nitrothiophene in 2000 parts of carrier, the kill in one-half hour was slightly over one-half that obtained with a concentration of one part in 1000 parts of carrier. It was also found that the nitrothiophene in the form of a spray was highly effective for killing insects. It was also determined that the nitrothiophenes are effective even after standing for considerable periods of time. For instance, a nitrothiophene was placed in a Petri dish and was allowed to stand exposed to the air for twenty-four hours and in another case for thirteen days before determining effectiveness. The percent of Tribolium which was paralyzed in eighteen hours after contacting with the nitrothiophene which had stood for twenty-hours was found to be 93%. In the case of the material which had stood for thirteen days similar results were obtained, namely, 93% paralysis of Tribolium when contacted with the nitrothiophene for eighteen hours. The insecticidal compositions in accordance with my invention are effective against various insecticidal pests, such as houseflies, silverfish, bean beetles, flea beetles, cucumber beetles, aphids, red spiders and other mites, thrips, etc.

We have also found that in the case of the halogenated nitrothiophenes that good fungicidal properties are also displayed thereby. For instance, the effectiveness of 2,5-dichloro-3,4-dinitrothiophene in concentrations of 1:400 1:800 and 1:1600 was determined in the case both of Glomerella and Alternaria. In these tests complete growth is rated 100 and no growth is rated 0. The following table gives the results of those tests compared with a check in which no nitrothiophene was used:

*Fungus growth index*

| Conc. | Glomerella | Alternaria |
|---|---|---|
| 1:400 | 4 | 0 |
| 1:800 | 4 | 0 |
| 1:1600 | 33 | 1.5 |
| Check | 100 | 100 |

The proportion of the nitrothiophenes to be employed in insecticidal compositions in accordance with our invention may vary over a wide range. For instance, insects having little or no protective covering are readily susceptible to the effect of these materials and thus, even as little as 0.5% thereof would be effective. Ordinarily, however, a higher percentage of the nitrothiophene is desirable being most useful in the proportion of 1-10% in the composition. If desired, other insecticidal materials may be used as an additive to or to displace part of the nitrothiophene which is present in the insecticidal composition. For instance, insecticides, such as pyrethrum, rotenone, nicotine, calcium or lead arsenate, p-dichlorobenzene, or the like, may be incorporated in the compositions in accordance with our inventions. If desired, mixtures of the nitrothiophenes may be employed. In some cases it may be desirable to also include fungicidal materials, such as lime-sulfur, sulfur, Bordeaux mixture, yellow copper oxide, mercury compounds, or the like. Also, it may be desired to incorporate synergists in insecticidal compositions in accordance with our invention to enhance the effectiveness of those compositions. Some compounds which do not themselves exhibit insecticidal properties but which increase the effectiveness of the nitrothiophenes are piperonyl butoxide, piperonyl propoxide, and piperonyl butyl carbitol oxide. A small proportional of the synergist may be incorporated in the composition, but any proportion from 0.5% up to 5% of that material may be employed to good effect.

We have found that petroleum distillates are particularly effective as solvents in preparing nitrothiophene insecticidal compositions, such as petroluem hydrocarbons having a boiling range of 80-150° C. Some of the petroleum distillates which are useful in this connection are kerosene, ligroin, naphtha, and the like. For dusting compositions we have found pyrophyllite to be of advantage for the carrier for the nitrothiophene to be used in the insecticidal compositon.

The following examples illustrate compositions in accordance with our invention which are particularly effective for insecticidal purposes:

*Example 1.*—The following composition is particularly effective for use as aerosols in which a propelling liquid is present:

| | Per cent |
|---|---|
| 2,4-dinitrothiophene | 5 |
| Refined petroleum distillate | 12-15 |
| Inert propellant, such as dichlorofluoro methane or methyl chloride | 85 |

*Example 2.*—The following is an example of an insecticidal composition in which other materials having insecticidal properties are incorporated:

| | Per cent |
|---|---|
| 2,4-dinitrothiophene | 2 |
| Pyrethrin extract | 0.2 |
| Piperonyl butoxide | 1 |
| Petroleum distillate | 12 |
| Inert propellant | 84.8 |

*Example 3.*—Instead of using a propellant a solution of nitrothiophene in a petroleum distillate is emulsified in water by means of an emulsifying agent such as whale oil soap, ordinary soap, sodium lauryl sulfate, or some other wetting agent. This aqueous emulsion is useful in the form of a spray for application to areas where undesirable insect life is found.

*Example 4.*—A particularly effective insecticidal dusting compound is obtained by incorporating 5-10% of 2,4-dinitrothiophene or some other nitrothiophene listed above in 90-95% of pyrophyllite in finely divided form.

*Example 5.*—500 parts of pyrophyllite was impregnated with a solution of 15 parts of 2,5-dichloro-2,3-dinitrothiophene in 275 parts of ethanol. A paste was formed which was dried and ground to a powder. This powder was found to be useful for both insecticide and fungicide purposes.

*Example 6.*—Ten parts of 2-chloro-5-bromo-3,4-dinitrothiophene and 1 part of pyrethrum extract were dissolved in 1000 parts of kerosene. The solution was sprayed onto seeds, plants, cloth and the like. Good protection against insects and fungi was obtained.

*Example 7.*—Ten parts of 3,4-dibromo-2,5-dinitrothiophene, 1 part of piperonyl butoxide and 1000 parts of difluorodichloromethane were placed in a bomb. This composition when sprayed into the air was found to be effective for insecticidal purposes, achieving a substantially complete kill in a short time.

*Example 8.*—One part of 2,5-dichloro-3,4-dinitrothiophene, 1 part of 2,5-dibromo-3,4-dinitrothiophene and 1 part of 2,5 - dichloro - 3-nitrothiophene were dissolved in 500 parts of kerosene with 2 parts of DDT, 1 part of piperonyl butoxide, and 1 part of

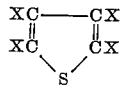

The composition formed was found to be effective for insecticidal purposes.

We claim:

1. An insecticidal composition comprising an insecticidal proportion of 2,4-dinitrothiophene and a refined petroleum distillate.

2. An insecticidal composition comprising an insecticidal proportion of 2,4-dinitrothiophene and finely divided pyrophyllite.

3. A method of killing insects which comprises contacting the insects with 2,4-dinitrothiophene.

4. An insecticidal composition essentially consisting of a uniform dispersion of 0.5–10% of an active ingredient having the formula:

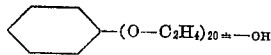

wherein X are substituents selected from the group consisting of $NO_2$ and H, at least one and not more than 2 of those substituents being nitro groups, and an inert insecticidal adjuvant as a carrier for the active ingredient.

5. An insecticidal composition essentially consisting of a uniform dispersion of 0.5–10% of 2,4-dinitrothiophene as the active ingredient and an inert insecticidal adjuvant as a carrier for the active ingredient.

6. A method of killing insects which comprises contacting the insect with a nitrothiophene having the formula:

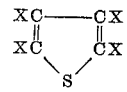

wherein X are substituents selected from the group consisting of $NO_2$ and H, at least one and not more than 2 of those substituents being nitro groups.

References Cited in the file of this patent

UNITED STATES PATENTS

| Number | Name | Date |
|---|---|---|
| 2,600,126 | Nolan et al. | June 10, 1952 |
| 2,651,579 | Plump | Sept. 8, 1953 |

FOREIGN PATENTS

| Number | Country | Date |
|---|---|---|
| 526,066 | Great Britain | Sept. 10, 1940 |

Frear: A Catalogue of Insecticides and Fungicides, vol. II, 1948, Waltham, Mass., Chronica Botanica Co., pages 27–28.

May et al.: May's Chemistry of Synthetic Drugs, Longmans Green & Co., N. Y., 4th ed., 1939, page 9.

J. Am. Pharm. Assn., August 1948, pp. 317–319.

Dann: Chemical Abstracts (1947), vol. 41, pp. 3090–2.

Johnson et al.: J. Biol. Chem., 153, pp. 37–47 (1944).